United States Patent Office 3,041,321
Patented June 26, 1962

3,041,321
VULCANIZATION OF ELASTOMERS OF MONOALPHA OLEFINS
Edward A. Youngman, Lafayette, and William A. Hewett, Oakland, Calif., assignors to Shell Oil Company, a corporation of Delaware
No Drawing. Filed Aug. 27, 1959, Ser. No. 836,329
19 Claims. (Cl. 260—88.2)

This invention relates to the vulcanization of certain synthetic elastomers. More particularly, it relates to methods of vulcanizing elastomeric copolymers of mono-olefins.

In Irish patent application 695/56, published January 9, 1957, there are described processes for producing synthetic elastomers by the copolymerization of mono-alpha-olefins having up to six carbon atoms. The resulting copolymers, as the Irish patent application points out, are true copolymers as distinguished from physical mixtures of homopolymers. Further, the copolymers are characterized as being normally amorphous which, on stretching, crystallize. The crystallizable feature of the elastomers indicate that they may be useful, after vulcanization or curing, as synthetic rubbers. However, the Irish patent application does not disclose how the elastomers may be vulcanized and on considering the elastomeric copolymers in greater detail it will be seen that the means of accomplishing a cure of the elastomers is not readily apparent because they are free, or essentially free of ethylenic unsaturation. The lack of unsaturation means that, as a practical matter there are no sites at which vulcanization can take place.

Other publications have dealt with methods of introducing vulcanizable sites into the elastomeric copolymer. One such proposal has been to carry out the processes for the production of the elastomeric copolymer in the presence of a third unsaturated monomer, as acetylene, and in that way the third unsaturated monomer would interpolymerize to introduce vulcanizable unsaturation into an elastomeric copolymer. This technique however has not been demonstrated to be operable and indeed it is likely other complications would arise that would defeat or prevent the introduction of unsaturation. Still other techniques have been proposed but none of them, as far as is known, have been demonstrated to be operable to the extent that a useful synthetic elastomer of mono-olefin copolymer is produced.

In this description whenever reference is made to "elastomeric copolymers of mono-olefins" or words of similar meaning, it is to be understood that reference is had to copolymers of at least two olefins of the formula $CH_2=CHR$ where R is hydrogen or an alkyl radical having up to four carbon atoms. Representative mono-olefins include ethylene, propylene, butene-1, pentene-1, hexene-1, 4-methyl-pentene-1, and the like. Representative elastomeric copolymers include ethylene-propylene, ethylene-butene-1, ethylene-pentene-1, propylene-hexene-1 and the like. In a preferred embodiment the elastomers are prepared with ethylene and one other mono-olefin having up to 6 carbon atoms and particularly preferred are the elastomeric copolymers of ethylene and propylene. For the sake of brevity and because the present invention applies equally to the elastomeric copolymers of the type mentioned above, the invention will be described mainly as it relates to the most preferred embodiment of the ethylene-propylene elastomers.

It is an object of this invention to provide novel methods for vulcanizing elastomeric copolymers of mono-alpha-olefins. It is still another object of this invention to provide novel methods for vulcanizing elastomeric copolymers of mono-alpha-olefins, which elastomers are free or essentially free of ethylenic unsaturation. It is yet another object of this invention to provide such vulcanizates which exhibit the properties of useful rubber. Other objects will become apparent as the description of the invention proceeds.

These and other objects are accomplished by the method of vulcanizing elastomeric copolymers of mono-alpha-olefins having up to 6 carbon atoms, the copolymer being crystallizable on stretching and being essentially free of ethylenic unsaturation comprising blending the elastomer with (1) an organic peroxide and (2) a compound selected from the group consisting of (a) polynuclear aromatic hydrocarbons having from 3 to 8 condensed rings, and (b) heterocyclic analogs of (a) wherein the heteroatom is nitrogen, and (c) mixtures thereof, and thereafter vulcanizing the composition at elevated temperatures. The vulcanizate which is achieved with the instant curing system will be found to be a highly useful synthetic rubber which has advantages not afforded by prior art synthetic elastomers.

The elastomeric copolymers, as previously indicated, may be prepared by the procedures and techniques described in Irish patent application 695/56 and those processes for the preparation of the elastomeric copolymers, and the copolymers themselves, form no part of this invention. However, for the sake of convenience the processes for producing the copolymers will be briefly described here but reference may be had to the above-mentioned Irish application for more detail.

In essence, the elastomeric copolymers are produced by polymerizing a mixture of monomers, as ethylene and propylene, in the presence of an inert hydrocarbon solvent with a catalyst that comprises the reaction product of a metallo-alkyl compound of groups I, II or III and a compound of a metal halide as vanadium chloride or vanadium oxychloride. The ratio of monomers, as ethylene to propylene, that is maintained during the polymerization will vary depending on the proportion of the respective monomers desired in the final elastomer. This in turn will vary depending upon the ultimate formulation desired in the vulcanizate. In any case, in the preferred embodiments the elastomer may contain from about 20 mole percent to about 90 mole percent of ethylene units in the copolymer and still be useful in the formation of rubbers. Because the monomers do not polymerize at the same rate, i.e., ethylene polymerizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration, Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexylaluminum and vanadium oxychloride in a mole ratio of 3.0:1.

TABLE I

| Mole Percent Ethylene in Feed Gases | Mole Percent Ethylene in Copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compoundns as the catalyst component include trioctyl aluminum, trinonyl aluminum, tridecyl aluminum, triisobutyl aluminum, and others. Preferably the alkyl radicals of the trialkyl aluminum have more than 4 carbon atoms but not more than 16 carbon atoms. For economic reasons, the number of carbon atoms in the alkyl radicals preferably range from 4 to 10. The ratio of the aluminum compounds to the vanadium oxychloride or vanadium tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

The organic peroxide utilized as one of the components of the vulcanizing agent may be any organic peroxide. This definition excludes hydrogen peroxide which is not suitable for the purposes of this invention as it is not feasible to incorporate it into the elastomer. Also unsuitable are metallic peroxides, as calcium peroxide, as such compounds have decomposition temperatures that are too high so that they do not, in effect, generate the needed free radicals. While the mechanisms of this invention are not fully understood it is believed that the organic peroxide functions, in part, to form free radicals by abstracting hydrogen atoms from the saturated elastomeric copolymers. The resulting activated sites can then combine with each other to form carbon-to-carbon linkages. It is here that the polynuclear compound comes into play and it is believed that it assists or participates in cross-linking. Because the mechanisms of this invention contemplate that free radicals be created by the decomposing peroxide it will be seen that other compounds which can directly or indirectly supply free radicals may be similarly employed. Among such compounds there may be mentioned other peroxygen compounds such as persulfates, perboates, percarbonates and the like. Among the organic peroxides that may be employed mention is made of dicumyl peroxide, di-tert-butyl peroxide, tert-butyl cumyl peroxide, benzoyl peroxide, lauroyl peroxide, tetraline peroxide, urea peroxide, butyryl peroxide, tert-butyl-perbenzoate and the like. Although organic peroxides as a class are suitable for the purposes of this invention not all organic peroxides or peroxygen-type compounds are equivalent because of differences in decomposition rates inherent in their structure. This, in effect, means that the curing cycles of heat and pressure during vulcanization will require modification depending upon the choice of the peroxygen-type of compound used. Also to be considered is the effect of the residue of the peroxide on the ultimate physical properties of the vulcanized elastomer. In general those peroxides which have decomposition temperatures at or below vulcanization temperatures are most preferred and more preferred are those that have decomposition temperatures ranging from about 5 to 40° C. below vulcanization temperatures. Vulcanization temperatures, as commonly understood in the art, range from 100 to 200° C. Thus, it will be seen that the choice of a particular peroxide largely depends upon the vulcanization temperatures and such temperatures are largely a matter of choice that is made by a skilled rubber chemist after considering the composition of the unvulcanized rubber. Among the more suitable peroxides there may be mentioned dicumyl peroxide, tert-butyl cumyl peroxide, di-tert-butyl peroxide, lauroyl peroxide, and the like. In general, lower molecular weight peroxides, as di-tert-butyl peroxide, are less preferred as they tend to evaporate at preferred processing and/or vulcanization temperatures. Nevertheless, such peroxides may be usefully employed by adsorbing the peroxide on materials, such as molecular sieves, which are otherwise not injurious to vulcanization, and/or modifications in the formulation of the unvulcanized elastomer composition.

The polynuclear compounds may be generically represented by the formula

where the ring is part of a condensed polynuclear molecule which may be all hydrocarbon, A in the formula is carbon or nitrogen, and the formula does not show the arrangement of the valence bonds since there may be considerable variation depending on A and the location of the ring in relation to the other condensed rings that constitute the molecule.

In one of the more preferred embodiments of this invention, A in the formula is carbon so that the polynuclear compound is a hydrocarbon such as an anthracene, pyrene, benzanthracene, phenanthrene, napthacene, and the like. Still other polynuclear hydrocarbons may be employed but care should be exercised to avoid the use of carcinogenic hydrocarbons. The other class of condensed polynuclear compounds is heterocyclic nitrogen compounds as acridine, benzacridine, and the like.

An outstanding advantage of the present invention is that the polynuclear compounds are quite inexpensive when in the crude form and this is particularly true of the more preferred embodiments. As a matter of fact, one of the main reasons for expressing a preference is based on the cost consideration. Thus, for example, a crude anthracene, such as that which is recovered from the refining of coal tar, is perfectly suitable for this invention. Other highly useful crudes that are suitable are the high boiling residues (or petroleum bottoms) that have boiling points in the order of 340° C. or higher. Such crudes are rich in the polynuclear hydrocarbons. They also contain substantial amounts of the nitrogen containing heterocyclic analogs, such as acridine and carbazole. In view of these considerations and the ready availability of crude materials, it becomes uneconomical to use polynuclear compounds that are more pure than necessary.

The quantity of peroxide required to effect suitable vulcanization of the elastomers will vary depending on such considerations as the particular copolymer involved, the particular polynuclear compound selected and the physical properties of the elastomer, particularly the ethylene content. Normally, the choice of peroxide will be influenced by the conditions of time, temperature and pressure to be used during vulcanization. Generally, amounts ranging from 0.1 to about 10 parts per hundred of elastomer will cover most cases. Amounts in the order of 1 to 5 parts per hundred will be suitable for the most preferred ethylene-propylene copolymers when they have I.V.'s ranging from about 2.0 to about 7.0, although with higher I.V.'s lesser amounts may be employed. The polynuclear compounds are used in amounts on the order of 0.1 to 4 phr. The described amounts of these components refer to the pure or active ingredients and in most cases a simple calculation will be required to adjust for inert ingredients.

In the following examples the elastomer stock consists of ethylene-propylene copolymer prepared by the procedures previously indicated. In all cases the elastomer stock is milled with high abrasion furnace black, the indicated peroxide and the indicated polynuclear compound. The temperature of the mill rolls is about 20° C. but the milling stock is at about 40–60° C. The temperature of the milling rolls or the elastomer stock should not, in any event, be permitted to rise above the decomposition temperature of the peroxide. The milling is continued until a homogeneous blend is obtained. Thereafter, the milled product is vulcanized at 153° C. for one hour and the indicated tests are performed.

Example I

This is a control experiment in which the ethylene-propylene copolymer contains 60.0% of polymerized ethylene, has a raw Mooney viscosity (ML 1+4, 212° F.) of 66. The elastomer is milled with 50 phr. (parts per hundred) of HAF (high abrasion furnace black) and 3.5 and 2 phr. of 95% dicumyl peroxide, respectively, and then cured at 153° C. for one hour. The cured specimens have the following stress-strain properties at 23° C.:

|  | 3.5 phr. | 2.0 phr. |
|---|---|---|
| Tensile Strength, p.s.i. | 2,935 | 2,100 |
| 300% Modulus, p.s.i. | 2,760 | 1,025 |
| Elongation at Break, percent | 315 | 490 |
| Extension Set, percent | 10 | 90 |
| Shore Hardness | 62 | 58 |

Example II

Another sample of the same elastomer as in Example I is milled with 50 phr. of HAF, 3.5 phr. of 95% dicumyl peroxide and 1 phr. of anthracene. The cured composition has the following properties at 23° C.:

| | |
|---|---|
| Tensile strength, p.s.i. | 3650 |
| 300% modulus, p.s.i. | 1835 |
| Elongation at break, percent | 440 |
| Extension set, percent | 20 |
| Shore hardness | 62 |

Example III

Following the same procedures as in Example II, the raw elastomer is milled with 50 phr. of HAF, 3 phr. of 95% dicumyl peroxide and 1.0 phr. of anthracene. The cured composition has the following properties at 23° C.:

| | |
|---|---|
| Tensile strength, p.s.i. | 3900 |
| 300% modulus, p.s.i. | 1710 |
| Elongation at break, percent | 505 |
| Extension set, percent | 23 |
| Shore hardness | 62 |

Example IV

In this experiment the ethylene-propylene elastomer contains 54.5% of polymerized ethylene. The raw elastomer, having a raw Mooney viscosity of 96 at 212° F. and an I.V. of 4.5 dl./g. (decaliters per gram), is milled for five hours to reduce the raw Mooney viscosity to 66, and then compounded with 50 phr. of HAF and 3.5 phr. of the 95% dicumyl peroxide. The stress-strain properties at 23° C. of cured samples are as follows:

| | |
|---|---|
| Tensile strength, p.s.i. | 1575 |
| 300% modulus, p.s.i. | 1025 |
| Elongation at break, percent | 440 |
| Extension set, percent | 19 |

Example V

Using the same elastomer as in Example IV, 50 phr. of HAF, 3.5 phr. of 95% dicumyl peroxide and 2 parts of benzanthracene are milled and the resulting cured elastomer has the following stress-strain properties at 23° C.:

| | |
|---|---|
| Tensile strength, p.s.i. | 3710 |
| 300% modulus, p.s.i. | 1780 |
| Elongation at break, percent | 470 |
| Extension set, percent | 21 |

Example VI

In this experiment the copolymer, of I.V. 5.1, contains 46 mole percent of copolymerized ethylene. It is blended with 50 parts HAF and 4 parts of tert-butyl cumyl peroxide. The cure is at 153° C. for 60 minutes and the cured product has the following properties:

| | |
|---|---|
| Tensile strength, p.s.i. | 2270 |
| 300% modulus, p.s.i. | 1360 |
| Elongation at break, percent | 665 |
| Extension set, percent | 19 |

Example VII

Using the elastomer of Example VI with, additionally, 3 parts of crude anthracene, the cured product has the following properties:

| | |
|---|---|
| Tensile strength, p.s.i. | 3775 |
| 300% modulus, p.s.i. | 1035 |
| Elongation at break, percent | 665 |
| Extension set, percent | 12 |

The crude anthracene contains substantial amounts of acridine, carbazol and phenanthrene and is commercially available from coal tar refining.

Example VIII

In this experiment the copolymer, of I.V. 6.3, contains 71 mole percent of copolymerized ethylene. It is blended with 50 parts HAF and 4 parts of tert-butyl perbenzoate. The cure is at 150° C. for 20 minutes and the cured product has the following properties:

| | |
|---|---|
| Tensile strength, p.s.i. | 2940 |
| 300% modulus, p.s.i. | 2045 |
| Elongation at break, percent | 400 |
| Extension set, percent | 55 |

Example IX

Using the elastomer of Example VIII with, additionally, 0.3 part of naphthacene, the cured product has the following properties:

| | |
|---|---|
| Tensile strength, p.s.i. | 4550 |
| 300% modulus, p.s.i. | 2260 |
| Elongation at break, percent | 450 |
| Extension set, percent | 40 |

In general, the stress-strain properties except extension set are better when the copolymer contains a higher proportion of ethylene. However, processability decreases with increasing ethylene content and a compromise between processability and maximum stress-strain properties must be made. Further, as the ethylene content increases beyond about 80 mole percent, the resilience decreases while the tensile strength remains high. By about 90 mole percent of polymerized ethylene, the resilience is quite low. Irrespective of these considerations, it will be appreciated that the properties of cured specimens may be varied a great deal by such expedients as changing the cure times and/or temperatures. Further, considerable variations in the stress-strain properties can be achieved by varying the composition of the elastomer, nature of the reinforcing carbon black, of which HAF is merely representative, the organic peroxide and the polynuclear compound and their respective amounts. In any case, suitable vulcanizates will be provided when the organic peroxides and the polynuclear compounds are used as the curing agents. Further, synthetic elastomers of the mono-olefin copolymers may ultimately be formulated with a large variety of known rubber chemicals such as accelerators, activators, antioxidants, plasticizers, softeners, tackifiers, fillers, diluents, pigments and the like. Such formulations in no way detract from the ability of the present invention to cause the raw elastomer composition to be vulcanized. This applies not only to ethylene-propylene elastomeric compositions but also to others of the type described in the previously mentioned Irish patent application.

Example X

An elastomeric ethylene-pentene-1 copolymer containing about 48% polymerized ethylene is milled with 50 phr. of HAF, 3 phr. of tert-butyl cumyl peroxide and 2 phr. of acridine. The resulting blend is subjected to vulcanization at 165° C. for 60 minutes and the resulting product is found to have been cured.

We claim as our invention:

1. A method of vulcanizing elastomeric copolymers of ethylene and one other mono-alpha-olefins having up to 6 carbon atoms, the copolymer being essentially free of ethylenic unsaturation, comprising blending the copolymer with (1) from 0.1 to 10 parts per hundred of copolymer of an organic peroxide and (2) from 0.1 to 4 parts per hundred of copolymer of a compound selected from the group consisting of (a) polynuclear aromatic hydrocarbons having from 3 to 8 condensed rings, (b) heterocyclic analogs of (a) wherein the hetero-atom is nitrogen, and (c) mixtures thereof, and vulcanizing the blend at elevated temperatures.

2. The method of claim 1 in which the polynuclear hydrocarbon is anthracene.

3. The method of claim 1 in which the polynuclear hydrocarbon is benzanthracene.

4. The method of claim 1 in which the heterocyclic polynuclear hydrocarbon is acridine.

5. The method of claim 1 in which the heterocyclic polynuclear hydrocarbon is benzacridine.

6. The method of claim 1 in which the polynuclear hydrocarbon is naphthacene.

7. A method of vulcanizing elastomeric ethylene-propylene copolymers, the copolymer being essentially free of ethylenic unsaturation and having from 24 to 90% of polymerized ethylene, comprising blending the copolymer with (1) from 0.1 to 10 parts per hundred of copolymer of an organic peroxide and (2) from 0.1 to 4 parts per hundred of copolymer of a compound selected from the group consisting of (a) polynuclear aromatic hydrocarbons having from 3 to 8 condensed rings, (b) heterocyclic derivatives of (a) wherein the hetero-atom is nitrogen, and (c) mixtures thereof, and vulcanizing the blend at elevated temperatures.

8. The method of claim 7 in which the polynuclear hydrocarbon is anthracene.

9. The method of claim 7 in which the heterocyclic polynuclear hydrocarbon is benzanthracene.

10. The method of claim 7 in which the heterocyclic polynuclear hydrocarbon is acridine.

11. The method of claim 7 in which the polynuclear is benzacridine.

12. The method of claim 7 in which the polynuclear hydrocarbon is naphthacene.

13. A composition comprising a blend of (1) elastomeric copolymer of ethylene and one other monoolefin having up to 6 carbon atoms, the copolymer being essentially free of ethylenic unsaturation, (2) from 0.1 to 10 parts per hundred based on the copolymer of an organic peroxide, and (3) from 0.1 to 4 parts per hundred based on the copolymer of a compound selected from the group consisting of (a) polynuclear aromatic hydrocarbons having from 3 to 8 condensed rings, (b) heterocyclic analogues of (a) wherein the hetero-atom is nitrogen, and (c) mixture thereof.

14. The composition of claim 13 wherein the elastomeric copolymer is a copolymer of ethylene and propylene.

15. The composition of claim 13 wherein the polynuclear hydrocarbon is anthracene.

16. The composition of claim 13 wherein the polynuclear hydrocarbon is benzanthracene.

17. The composition of claim 13 wherein the heterocyclic polynuclear hydrocarbon is acridine.

18. The composition of claim 13 wherein the heterocyclic polynuclear hydrocarbon is benzacridine.

19. The composition of claim 13 wherein the polynuclear hydrocarbon is naphthacene.

References Cited in the file of this patent

UNITED STATES PATENTS

| | | |
|---|---|---|
| 2,434,662 | Latham et al. | Jan. 20, 1948 |
| 2,628,214 | Pinkney et al. | Feb. 10, 1953 |
| 2,826,570 | Ivett | Mar. 11, 1958 |
| 2,880,190 | Gleason | Mar. 31, 1959 |
| 2,888,424 | Precopio et al. | May 26, 1959 |
| 2,938,012 | Filar | May 24, 1960 |

UNITED STATES PATENT OFFICE
CERTIFICATE OF CORRECTION

Patent No. 3,041,321            June 26, 1962

Edward A. Youngman et al.

It is hereby certified that error appears in the above numbered patent requiring correction and that the said Letters Patent should read as corrected below.

Column 7, lines 23 and 25, after "heterocyclic", each occurrence, insert -- analog of the --; column 8, lines 3, 27 and 28, and lines 29 and 30, after "heterocyclic", each occurrence, insert -- derivative of --; same column 8, line 5, before "polynuclear" insert -- heterocyclic derivative of the --.

Signed and sealed this 24th day of September 1963.

(SEAL)
Attest:

ERNEST W. SWIDER
Attesting Officer

DAVID L. LADD
Commissioner of Patents